(12) United States Patent
Tsutsumikoshi et al.

(10) Patent No.: US 7,837,003 B2
(45) Date of Patent: Nov. 23, 2010

(54) STRADDLE TYPE VEHICLE WITH ELECTRIC POWER STEERING APPARATUS

(75) Inventors: Shinobu Tsutsumikoshi, Hamamatsu (JP); Tetsuya Banjo, Hamamatsu (JP)

(73) Assignee: Suzuki Kabushiki Kaisha, Hamamatsu-shi (JP)

( * ) Notice: Subject to any disclaimer, the term of this patent is extended or adjusted under 35 U.S.C. 154(b) by 148 days.

(21) Appl. No.: 12/212,395

(22) Filed: Sep. 17, 2008

(65) Prior Publication Data

US 2009/0078491 A1 Mar. 26, 2009

(30) Foreign Application Priority Data

Sep. 21, 2007 (JP) ............................. 2007-245774

(51) Int. Cl.
*B62D 5/04* (2006.01)
(52) U.S. Cl. ...................................................... 180/444
(58) Field of Classification Search ................ 180/444, 180/443, 446
See application file for complete search history.

(56) References Cited

U.S. PATENT DOCUMENTS

| 6,966,399 | B2 * | 11/2005 | Tanigaki et al. ............. 180/444 |
| 7,096,988 | B2 * | 8/2006 | Moriyama ................... 180/190 |
| 7,380,622 | B2 * | 6/2008 | Shimizu .................... 180/68.1 |

FOREIGN PATENT DOCUMENTS

| JP | 2004-231011 | 8/2004 |
| JP | 2006-224713 | 8/2006 |

* cited by examiner

*Primary Examiner*—Kevin Hurley
(74) *Attorney, Agent, or Firm*—Barnes & Thornburg LLP

(57) ABSTRACT

A straddle type vehicle with an electric power steering apparatus includes a vehicle body frame, a bar handle disposed in a front portion of the vehicle body frame, a steering shaft transmitting a turning operation of the bar handle to a pair of right and left front wheels, an electric power steering apparatus mounted in an intermediate portion of the steering shaft for assisting a steering motion of the bar handle, and an engine unit mounted in a center lower portion of the vehicle body frame in rear of the steering shaft. The electric power steering apparatus includes an electric motor arranged in front of the steering shaft.

10 Claims, 6 Drawing Sheets

STRADDLE TYPE VEHICLE WITH ELECTRIC POWER STEERING APPARATUS

CROSS-REFERENCE TO RELATED APPLICATIONS

This application is a U.S. Non-Provisional Utility Patent Application based upon and claiming the benefit of priority to Japanese Patent Application No. JP 245774/2007, filed on Sep. 21, 2007, the contents of which are incorporated herein by reference.

BACKGROUND OF THE INVENTION

1. Field of the Invention

This invention relates to a straddle type vehicle, particularly provided with an electric power steering apparatus.

2. Description of the Related Art

Generally, a straddle type vehicle such as an all terrain vehicle or the like includes an electric power steering apparatus for the purpose of reducing an operating force of a bar handle. When an electric motor id driven, an auxiliary rotating power is applied by the power steering apparatus applies to a steering shaft. Such electric motor may, for example, be arranged so as to be directed perpendicularly to an axis of a steering shaft and to cross an upper side of a front suspension support portion extending in a longitudinal direction of the vehicle toward the outside of a vehicle width direction (refer, for example, to Patent Document 1: Japanese Patent Application Laid-Open Publication No. 2004-231011), or arranged in the vicinity of a bearing portion in a lower portion of a steering shaft (refer, for example, to Patent Document 2: Japanese Patent Application Laid-Open Publication No. 2006-224713).

However, since the electric motor is arranged in the lower portion of the vehicle body in these conventional structures, the electric motor is often affected by muddy water and dust splashed by a front wheel. Further, the electric motor tends to be affected by heat from the engine. A foreign material such as the muddy water, the dust or the like and the heat deteriorate durability of the power steering apparatus constructed by an electronic device such as the electric motor, a controller and the like.

On the other hand, if the electric motor is arranged so as to cross an upper side of the front suspension support portion toward the outside of the vehicle width direction, a freedom of an actuation of a suspension apparatus may be limited.

SUMMARY OF THE INVENTION

The present invention is made by taking the circumstances mentioned above into consideration, and an object of the present invention is to provide a straddle type vehicle with an electric power steering apparatus capable of achieving high durability and good layout characteristics.

The above and other objects can be achieved according to the present invention by providing a straddle type vehicle with an electric power steering apparatus, comprising:

a vehicle body frame;

a bar handle disposed in a front portion of a vehicle body frame;

a steering shaft transmitting a turning operation of the bar handle to a pair of right and left front wheels;

an engine unit mounted in a center lower portion of the vehicle body frame in rear of the steering shaft; and an electric power steering apparatus mounted in an intermediate portion of the steering shaft for assisting a steering motion of the bar handle, the electric power steering apparatus including an electric motor arranged in front of the steering shaft.

In a preferred embodiment of the above aspect, the steering shaft may be pivotally supported to the vehicle body frame by an upper support portion and a lower support portion, and the electric motor is arranged on a side of the upper support portion between the upper support portion and the lower support portion.

The electric motor may be arranged above the vehicle body frame.

It may be desired that the electric motor is arranged above an upper front cushion unit support portion provided in the vehicle body frame so as to support an upper end of a front cushion unit.

It may be also desired that the electric motor is arranged above an upper edge of a visible outline of the front wheel in a side view.

The engine unit may include a forward tilted cylinder assembly, an exhaust pipe is connected to a front lower surface of a cylinder head of the cylinder assembly, and the electric motor is arranged above a front lower surface of the cylinder head.

It may be further desired that a radiator is provided in front of the steering shaft, and the electric motor is arranged above the radiator.

A radiator may be provided in front of the steering shaft, and a plate member is extended rearward from an upper end portion of the radiator so as to cover a lower side of the electric power steering apparatus.

The electric motor may be arranged within a space between the plate member and a front cowling covering the front portion of the vehicle, and an air inlet port is formed in the front cowling in the front side of the electric motor. The electric motor may be arranged so as to be biased to one side in a vehicle width direction in a plan view within the space, and a controller for controlling the electric power steering apparatus is arranged in another in the vehicle width direction.

The engine unit may include a variable transmission, an air inlet opening of an inlet duct in a cooling system of the variable transmission is arranged within a space between the plate member and the front cowling, and the electric motor is arranged in an intermediate portion of an air flowing path from the air inlet port to the air inlet opening of the inlet duct.

According to the straddle type vehicle with the electric power steering apparatus of the present invention, a cooling effect of the electric motor is improved, reliability and durability are increased, and an assist performance is improved.

Further, the arrangement of the electric motor does not affect engine layout or the like, and a compact vehicle can be constructed.

The nature and further characteristic features of the present invention will be made clearer from the following descriptions made with reference to the accompanying drawings.

DESCRIPTION OF THE PREFERRED EMBODIMENTS

A preferred embodiment of the present invention will be described hereunder with reference to the accompanying drawings, in which terms "right", "left", "upper", "lower" and the like are used with reference to the illustration of the drawings or a usual standing state of a vehicle.

Figure 1:
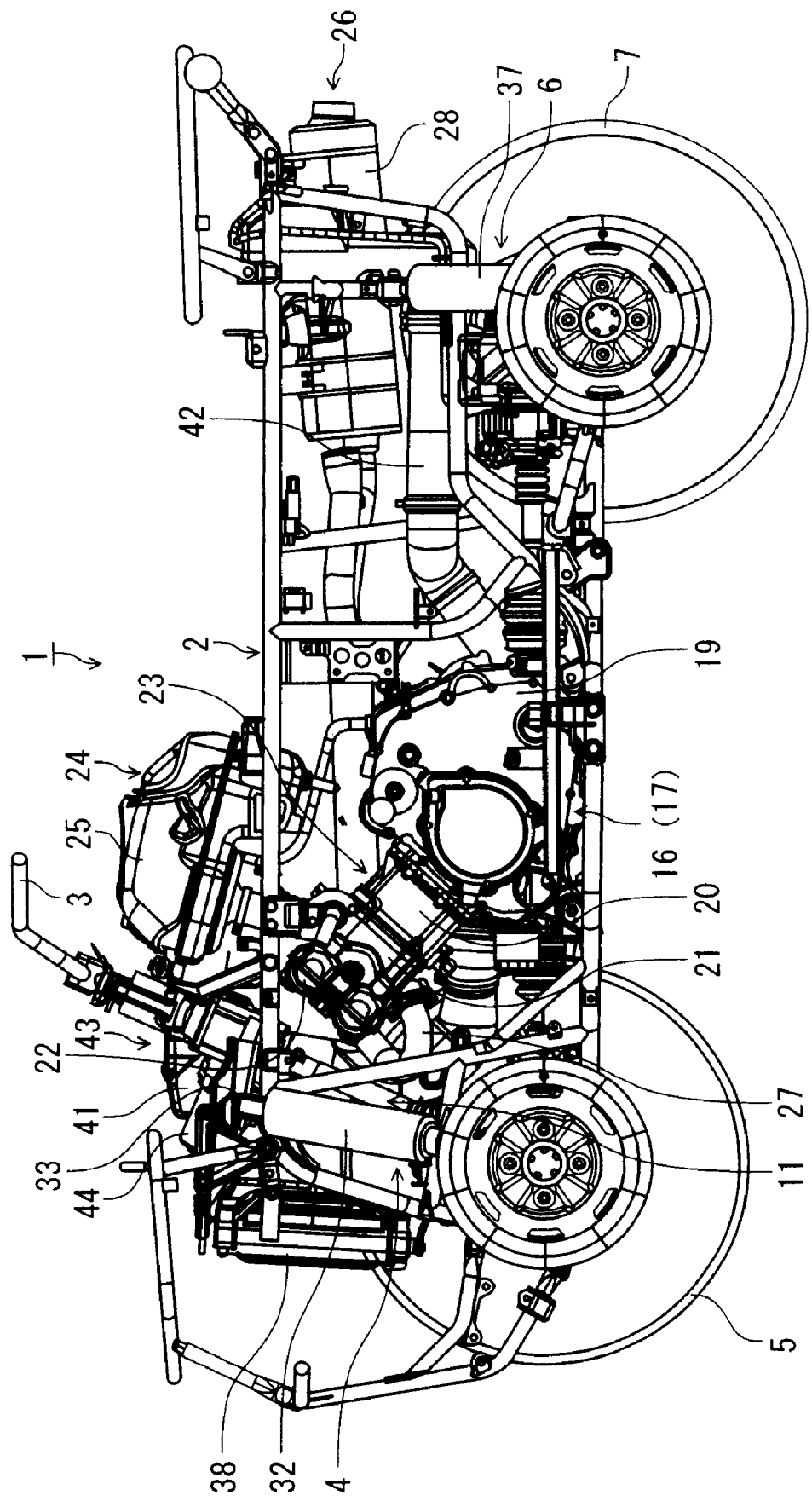
FIG. 1 is a left side view of an all terrain vehicle showing an embodiment of a straddle type vehicle with an electric power steering apparatus according to the present invention.
Figure 2:
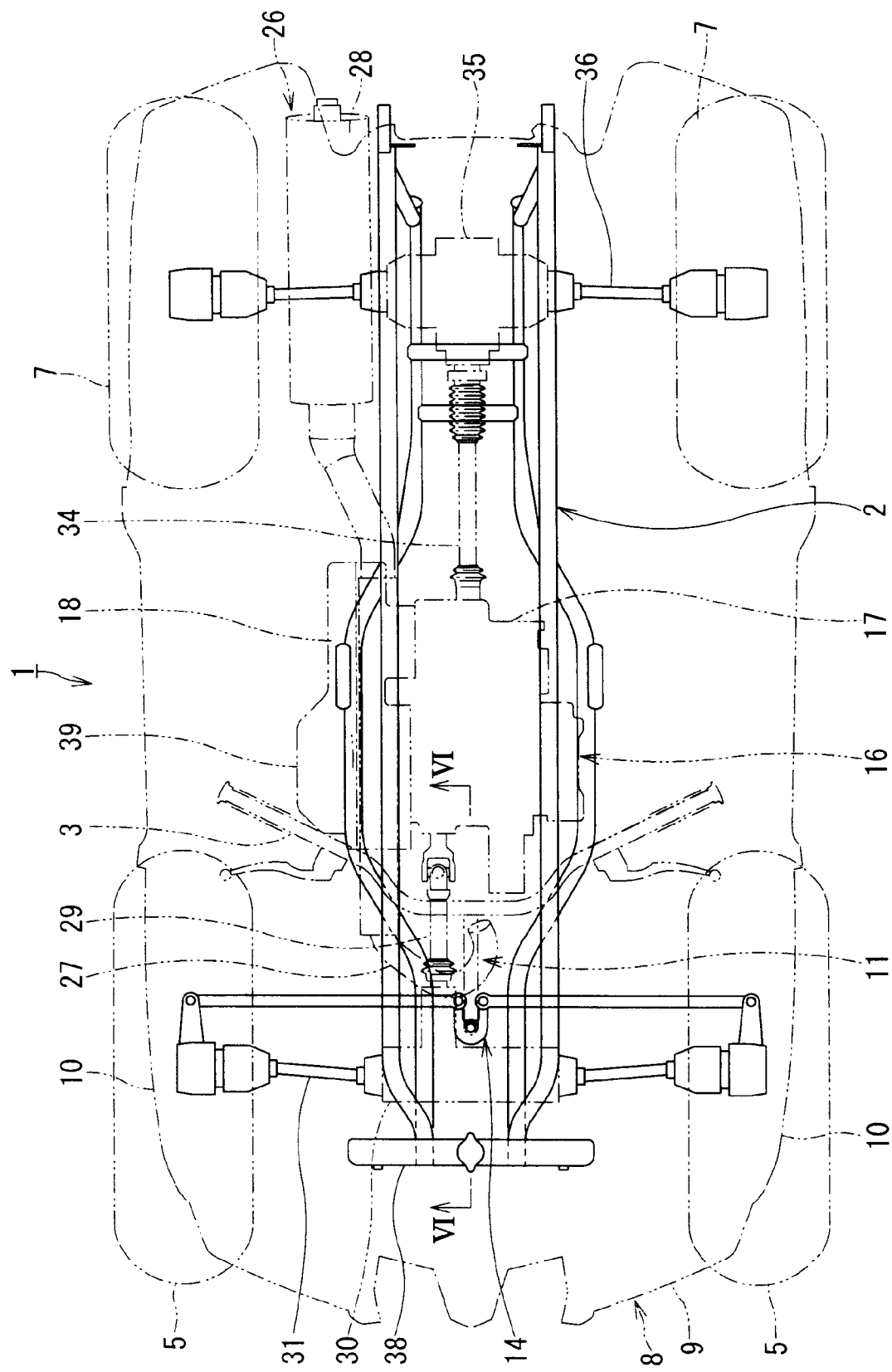
FIG. 2 is a schematic plan view of the all terrain vehicle shown in FIG. 1.

As shown in FIGS. 1 and 2, a straddle type all terrain vehicle 1 (which may hereinafter simply refer to as a vehicle) includes a vehicle body frame 2 constructed as an approximately cage shape, for example, by coupling a pair of right and left frame members made of a steel pipe in a width direction.

A bar handle 3 serving as a steering apparatus of the vehicle 1 is attached to a front upper portion of the vehicle body frame 2. Further, a pair of right and left front wheels 5 provided with wide low-pressure tires are mounted on a front portion of the vehicle body frame 2 via a front suspension mechanism 4, and a pair of right and left rear wheels 7 provided with wide low-pressure tires are mounted on a rear portion of the vehicle body frame 2 via a rear suspension mechanism 6, respectively.

Figure 3:
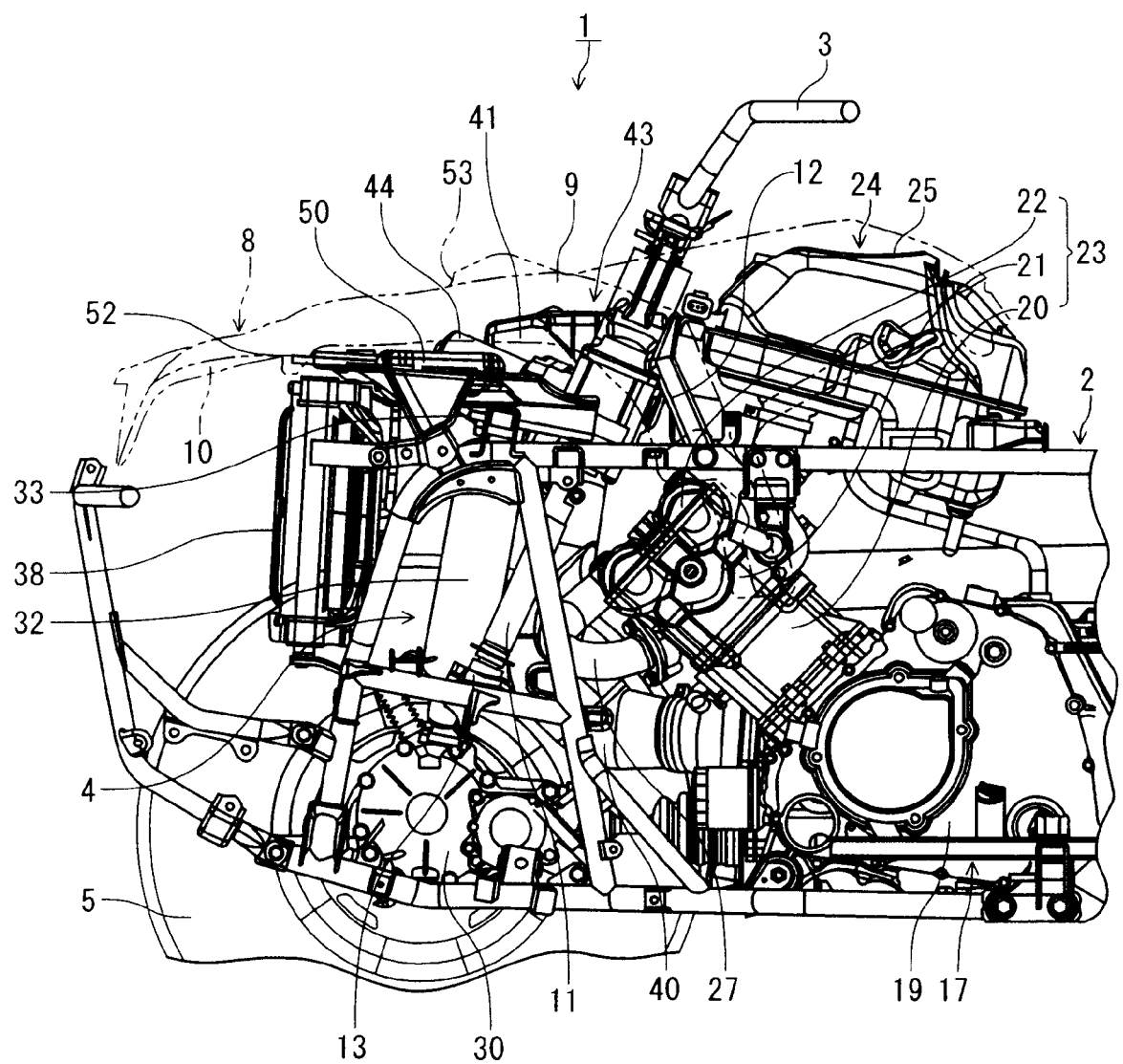
FIG. 3 is an enlarged left side view of a vehicle front portion.
Figure 4:
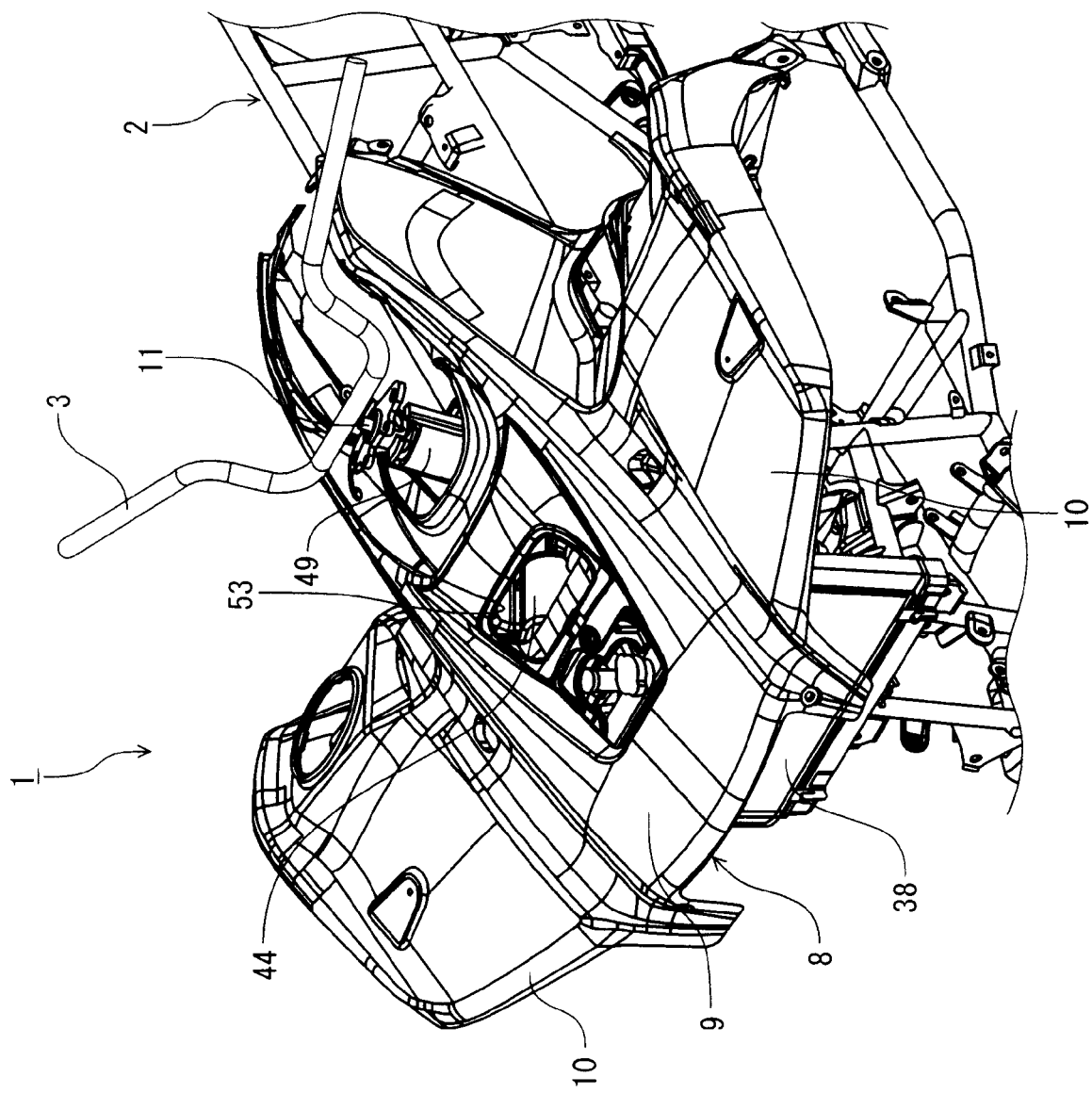
FIG. 4 is a perspective view of the vehicle front portion as seen from an anterior side.

As shown in FIGS. 2 to 4, an upper surface and a side surface of the vehicle 1 are covered by a vehicle body cover 8. A front upper portion of the vehicle 1 is covered by a front cowling 9 constructing the vehicle body cover 8, and a front fender 10 covering the right and left front wheels 5 is integrated or integrally formed in the front cowling 9. In this case, although not illustrated in detail, a vehicle body rear portion is covered by a rear cowling constructing the vehicle body cover 8, and a rear fender covering the right and left rear wheels 7 is integrated or integrally formed in the rear cowling.

A steering shaft 11 extends from a base portion of the bar handle 3 toward the front wheel 5 in a forward diagonally downward direction. An upper portion of the steering shaft 11 is pivotally supported by an upper support portion 12, for example, provided in an upper portion of the vehicle body frame 2.

Further, a lower portion of the steering shaft 11 is pivotally supported by a lower support portion 13, for example, provided in a lower portion of the vehicle body frame 2. As shown in FIG. 2, a lower end portion of the steering shaft 11 is coupled to a steering link mechanism 14, so that the front wheel 5 can be steered by operating the bar handle 3 right and left. An engine unit 16 is mounted in a center lower portion of the vehicle body frame 2, that is, between the front and rear wheels 5 and 7, and in rear of the steering shaft 11.

The engine unit 16 includes, for example, an engine main body 17 and a belt type continuously variable transmission 18 arranged in one side of the engine main body 17, for example, in a right side thereof. The engine main body 17 is, for example, a water-cooled four-cycle single cylinder engine, and includes a crank case 19, and a cylinder assembly 23 including a cylinder block 20, which is mounted on the crank case 19 and inclined forward at a comparatively large angle, a cylinder head 21 and a head cover 22.

An engine intake system 24 is arranged above the cylinder assembly 23 and in a rear space of the steering shaft 11. The engine intake system 24 includes a throttle body, not shown, connected to a rear side of the cylinder head 21, and an air cleaner 25 connected to an upper side of the throttle body.

On the other hand, an engine exhaust system 26 is arranged in one side of the engine main body 17 (in a right side in the present embodiment). The engine exhaust system 26 includes an exhaust pipe 27 connected to a front side lower surface of the cylinder head 21 and an exhaust muffler 28, the exhaust pipe 27 is temporarily extended toward a front side of the cylinder head 21 and extended toward a diagonally rear upper side little by little while being curved so as to bypass the cylinder assembly 23. A downstream end of the exhaust pipe is connected to the exhaust muffler 28.

A front wheel driving propeller shaft 29 extends toward a front side from a front portion of the crank case 19, and a front end of the shaft is coupled to a front final reduction gear unit 30.

Further, a pair of right and left front drive shafts 31 extend toward the right and left front wheels 5 from the front final reduction gear unit 30, and are coupled to the right and left front wheels 5.

Further, the vehicle body frame 2 is provided with a support portion 33 supporting an upper end of a pair of right and left front cushion units 32 of the front suspension mechanism 4, and the right and left front wheels 5 are elastically supported to the vehicle body frame 2 by the front cushion units 32.

On the other hand, a rear wheel driving propeller shaft 34 extends toward a rear side from a rear portion of the crank case 19, and a rear end of the shaft is coupled to a rear final reduction gear unit 35.

Further, a pair of right and left rear drive shafts 36 are extended toward the right and left rear wheels 7 from the rear final reduction gear unit 35, and are coupled to the right and left rear wheels 7. A pair of right and left rear cushion units 37 of the rear suspension mechanism 6 are supported to the vehicle body frame 2, and the right and left rear wheels 7 are elastically supported to the vehicle body frame 2 by the rear cushion units 37.

A heat exchanger of the engine main body 17, i.e., a radiator 38, for cooling the engine main body 17 is installed in the vicinity of a frontmost portion of the vehicle body frame 2, in the front side of the steering shaft 11.

Further, the belt type continuously variable transmission 18 of the engine unit 16 includes a transmission cooling system. The transmission cooling system forcibly ventilates an air within a belt case 39 accommodating the belt type continuously variable transmission 18 so as to cool the transmission, and includes an inlet duct 40, an air inlet opening 41 provided in an upstream end of the inlet duct 40, and a discharge duct 42 as main constructing members.

Figure 5:
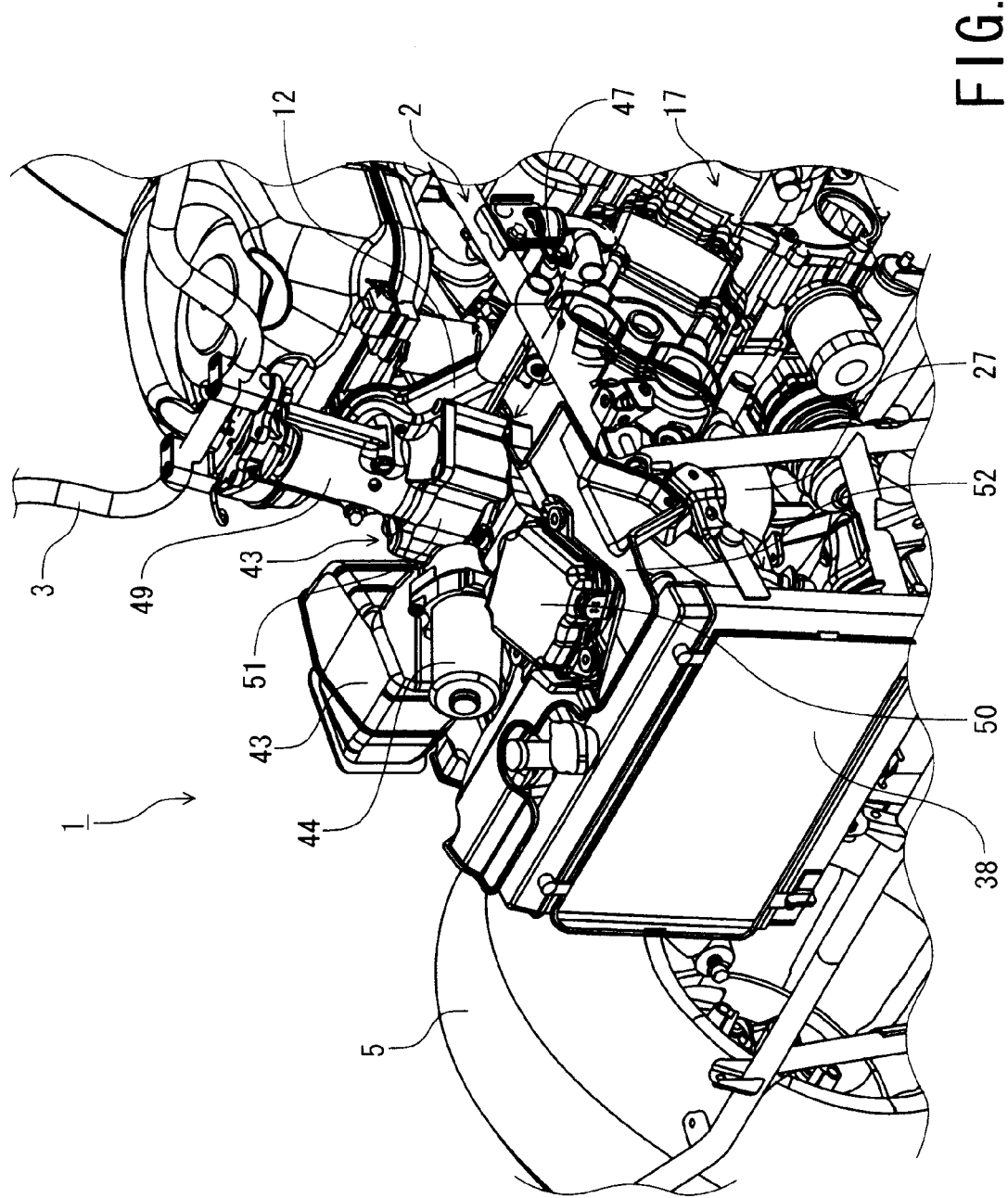
FIG. 5 is a perspective view of the vehicle front portion in a state where a front cowling is detached, as seen from an anterior side.
Figure 6:
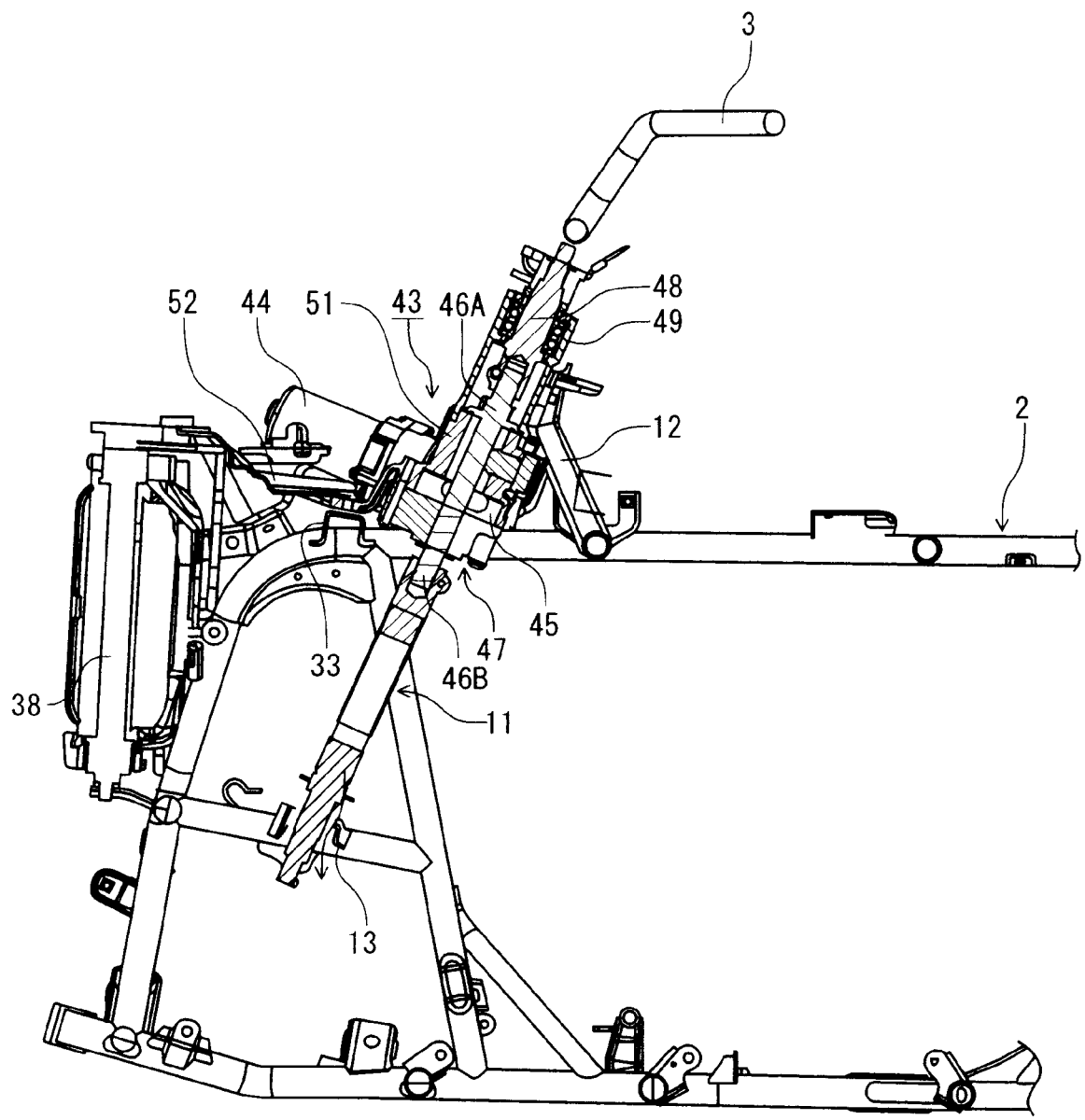
FIG. 6 is a cross sectional view taken along a line VI-VI of FIG. 2.

FIG. 5 is a perspective view of a front portion of the vehicle 1 in a state where the front cowling 9 is detached, and FIG. 6 is a cross sectional view taken along a line VI-VI of FIG. 2.

As shown in FIGS. 1 to 6, an electric power steering apparatus 43 for assisting a steering motion of the bar handle 3 is mounted at an intermediate portion of the steering shaft 11 transmitting the steering motion of the bar handle 3 to the front wheel 5.

The electric power steering apparatus 43 includes an electric power steering main body 47 including an electric motor 44, a gear unit 45, an input and output shafts 46A and 46B, an upper steering shaft 48, a support member 49 of the upper steering shaft 48, and a controller 50 controlling the electric power steering apparatus 43.

The bar handle 3 is attached to an upper end portion of the upper steering shaft 48, and an upper end of the input shaft 46A is connected to a lower end portion of the upper steering shaft 48. Further, the support member 49 of the upper steering shaft 48 is formed as a tubular shape, and is integrally provided in an upper portion of a case body 51 accommodating the gear unit 45 of the electric power steering main body 47.

The electric motor 44 is arranged in the vicinity of the upper support portion 12 between the upper support portion 12 and the lower support portion 13 of the steering shaft 11, and in the front side of the steering shaft 11. The electric motor 44 is arranged above an outside of the vehicle body frame 2, more specifically, above the upper front cushion unit support portion 33 supporting the upper end of the front cushion unit 32 and provided in the vehicle body frame 2.

As shown in FIG. 3, the electric motor 44 is arranged above an upper edge of a visible outline of the front wheel 5 as seen in a side view, and above the exhaust pipe 27 attached to a front side lower surface of the cylinder head 21 in the forward tilted cylinder assembly 23. Further, the electric motor 44 is arranged above an electric fan of the radiator 38 provided in front of the steering shaft 11.

On the other hand, a plate member 52 is extended rearward from an upper end portion of the radiator 38 so as to cover a lower side of the electric power steering apparatus 43. The electric motor 44 is arranged within a space between the plate member 52 and the front cowling 9 covering the front portion of the vehicle 1, and an air inlet port 53 is formed in front of the electric motor 44 in the front cowling 9.

As shown in FIG. 5, the electric motor 44 is arranged so as to be biased to one side in a vehicle width direction in a plan view in a space between the plate member 52 and the front cowling 9. The controller 50 is arranged in the other side in the vehicle width direction. Although not illustrated in detail, an input and output connectors, not shown, of the controller 50 are arranged so as to be directed to a rear side of the vehicle 1 so that a wiring to the electric motor 44 and a battery, not shown, becomes short.

Further, an air inlet opening 41 of an inlet duct 40 constructing the transmission cooling system is also arranged in the space between the plate member 52 and the front cowling 9, and the electric motor 44 is arranged in the intermediate portion of the air flowing path from the air inlet port 53 of the front cowling 9 to the air inlet opening 41 of the inlet duct 40.

An operation of the present embodiment of the structure mentioned above will be described hereunder.

In the embodiment, the electric motor 44 is arranged in an opposite side to the engine unit as a heat source with respect to the steering shaft 11, that is, in the front side of the steering shaft 11, so that the electric motor 44 is positioned at a position which is hard to be affected by a heat influence from the engine unit 16 and is easy to be exposed to the external air. Accordingly, a cooling effect and reliability of the electric motor 44 are improved, and thus, an assist performance can be improved.

Further, the electric motor 44 is arranged above the upper front cushion unit support portion 33 provided in the vehicle body frame 2 and supporting the upper end of the front cushion unit 32, in the vicinity of the upper support portion 12 between the upper support portion 12 and the lower support portion 13 of the steering shaft 11, and above the upper edge of the visible outline of the front wheel 5 in the side view, the electric motor 44 is positioned at a position which is easy to be exposed to the external air. Accordingly, the cooling effect of the electric motor 44 is improved. The electric motor 44 is also disposed at a position which is hard to be exposed to the water and the mud at a time of running on a river, a pond or the like. Accordingly, a reliability of the electric motor 44 is increased, and an assist performance is improved.

Furthermore, since the electric motor 44 is arranged above the outer side of the vehicle body frame 2, a compact vehicle 1 can be constructed without affecting an engine layout or the like in which the electric motor 44 is mounted in the vehicle body frame 2.

It is possible to keep the electric motor 44 away from the exhaust pipe 27, which is the largest heat source, by arranging the electric motor 44 above the front lower surface of the cylinder head 21 in the forward tilted cylinder assembly 23, thereby making the electric motor 44 hard to be exposed to the heat influence. Further, if the electric motor 44 is arranged above an electric fan of the radiator 38 provided in the front side of the steering shaft 11, the electric motor 44 is not exposed to hot air after the heat exchange by the radiator 38, the cooling effect and the reliability of the electric motor 44 are improved, and thus, the assist performance can be further improved. In this case, it is possible to make the electric motor 44 harder to be exposed to the heat influence by arranging the electric motor 44 so as to be biased to an opposite side in the vehicle width direction to the electric fan of the radiator 38 in the plan view.

Still furthermore, by extending the plate member 52 rearward from the upper end portion of the radiator 38 so as to cover the lower side of the electric power steering apparatus 43, the transmission of the radiated heat from the radiator 38 and the engine unit 16 to the electric motor 44 can be prevented, and a splash of water and mud from the lower side at a time of running can also be prevented. Accordingly, the durability and the reliability of the electric motor 44 are increased, and the assist performance can be also improved.

Since the electric motor 44 is arranged within the space between the plate member 52 and the front cowling 9 covering the front portion of the vehicle 1, and the air inlet port 53 is formed in the front cowling 9 in the front side of the electric motor 44, it is possible to directly conduct a fresh and cold cooling air to the electric motor 44, and the cooling performance of the electric motor 44 can thus be improved.

Furthermore, by arranging the electric motor 44 to be biased to one side in the vehicle width direction in the plan view within the space, and arranging the controller 50 in the other side in the width direction, a dead space can be effectively utilized, and a compact construction can be provided. Although not illustrated in detail, if the dedicated controller 50 is provided for the electric power steering apparatus 43, it is possible to miniaturize the engine controller 50, and it can be easy to arrange the controller 50 in the vehicle body frame 2.

Further, if the air inlet opening 41 of the inlet duct 40 of the transmission cooling system is arranged within the space between the plate member 52 and the front cowling 9, and the electric motor 44 is arranged in the middle of the air flowing path from the air inlet port 53 of the front cowling 9 toward the air inlet opening 41 of the inlet duct 40, the cooling air securely comes into contact with the electric motor 44, and the cooling performance of the electric motor 44 is improved.

It is further to be noted that the present invention is not limited to the described embodiment and many other changes and modifications may be made without departing from the scopes of the appended claims.

What is claimed is:

1. A straddle type vehicle with an electric power steering apparatus, comprising:
   a vehicle body frame;
   a bar handle disposed in a front portion of a vehicle body frame;

a steering shaft transmitting a turning operation of the bar handle to a pair of right and left front wheels;

an engine unit mounted in a center lower portion of the vehicle body frame in rear of the steering shaft; and an electric power steering apparatus mounted in an intermediate portion of the steering shaft for assisting a steering motion of the bar handle, the electric power steering apparatus including an electric motor arranged in front of the steering shaft and above the vehicle body frame.

2. The straddle type vehicle according to claim 1, wherein the steering shaft is pivotally supported to the vehicle body frame by an upper support portion and a lower support portion, and the electric motor is arranged on a side of the upper support portion between the upper support portion and the lower support portion.

3. The straddle type vehicle according to claim 1, wherein the electric motor is arranged above an upper front cushion unit support portion provided in the vehicle body frame so as to support an upper end of a front cushion unit.

4. The straddle type vehicle according to claim 1, wherein the electric motor is arranged above an upper edge of a visible outline of the front wheel in a side view.

5. The straddle type vehicle according to claim 1, wherein the engine unit includes a forward tilted cylinder assembly, an exhaust pipe is connected to a front lower surface of a cylinder head of the cylinder assembly, and the electric motor is arranged above a front lower surface of the cylinder head.

6. The straddle type vehicle according to claim 1, wherein a radiator is provided in front of the steering shaft, and the electric motor is arranged above the radiator.

7. The straddle type vehicle according to claim 1, wherein a radiator is provided in front of the steering shaft, and a plate member is extended rearward from an upper end portion of the radiator so as to cover a lower side of the electric power steering apparatus.

8. The straddle type vehicle according to claim 7, wherein the electric motor is arranged within a space between the plate member and a front cowling covering the front portion of the vehicle, and an air inlet port is formed in the front cowling in the front side of the electric motor.

9. The straddle type vehicle according to claim 8, wherein the electric motor is arranged so as to be biased to one side in a vehicle width direction in a plan view within the space, and a controller for controlling the electric power steering apparatus is arranged in another in the vehicle width direction.

10. The straddle type vehicle according to claim 8, wherein the engine unit includes a variable transmission, an air inlet opening of an inlet duct in a cooling system of the variable transmission is arranged within a space between the plate member and the front cowling, and the electric motor is arranged in an intermediate portion of an air flowing path from the air inlet port to the air inlet opening of the inlet duct.

* * * * *